United States Patent
Cohen et al.

(10) Patent No.: US 8,538,754 B2
(45) Date of Patent: *Sep. 17, 2013

(54) INTERACTIVE TEXT EDITING

(75) Inventors: Richard Z. Cohen, London (GB); Marcus A. Foster, Kent (GB); Luca Zanolin, London (GB)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,213

(22) Filed: Sep. 14, 2012

(65) Prior Publication Data

US 2013/0085754 A1 Apr. 4, 2013

Related U.S. Application Data (63) Continuation of application No. 13/270,927, filed on Oct. 11, 2011, now Pat. No. 8,290,772.

(60) Provisional application No. 61/542,727, filed on Oct. 3, 2011.

(51) Int. Cl.
*G10L 15/26* (2006.01)

(52) U.S. Cl.
USPC ......... 704/235; 704/251; 369/25.01; 715/257

(58) Field of Classification Search
USPC ............... 704/235, 251; 369/25.01; 715/257
See application file for complete search history.

(56) References Cited

U.S. PATENT DOCUMENTS

| | | | |
|---|---|---|---|
| 5,712,957 A | 1/1998 | Waibel et al. | |
| 5,909,667 A | 6/1999 | Leontiades et al. | |
| 6,182,028 B1 | 1/2001 | Karaali et al. | |
| 6,405,170 B1 * | 6/2002 | Phillips et al. | 704/270 |
| 6,606,598 B1 * | 8/2003 | Holthouse et al. | 704/275 |
| 7,149,970 B1 | 12/2006 | Pratley et al. | |
| 7,542,902 B2 * | 6/2009 | Scahill et al. | 704/251 |
| 2005/0043949 A1 | 2/2005 | Roth et al. | |
| 2005/0203751 A1 | 9/2005 | Stevens et al. | |
| 2007/0011012 A1 | 1/2007 | Yurick et al. | |
| 2008/0077859 A1 | 3/2008 | Schabes et al. | |
| 2010/0179801 A1 | 7/2010 | Huynh et al. | |
| 2010/0287486 A1 | 11/2010 | Coddington | |
| 2011/0202836 A1 | 8/2011 | Badger et al. | |

OTHER PUBLICATIONS

G-mail Screenshot representing spell-check functionality available at least as of Oct. 10, 2010, 1 page.
International Search Report & Written Opinion, Patent Cooperation Treaty, PCT Application No. PCT/US2012/057313, mailed Mar. 29, 2013. 7 pages.
European Search Report for corresponding Application No. EP 12186886.3 dated Feb. 25, 2013; 6 pages.

* cited by examiner

*Primary Examiner* — Daniel D Abebe
(74) *Attorney, Agent, or Firm* — Fish & Richardson P.C.

(57) ABSTRACT

A method for providing suggestions includes capturing audio that includes speech and receiving textual content from a speech recognition engine. The speech recognition engine performs speech recognition on the audio signal to obtain the textual content, which includes one or more passages. The method also includes receiving a selection of a portion of a first word in a passage in the textual content, wherein the passage includes multiple words, and retrieving a set of suggestions that can potentially replace the first word. At least one suggestion from the set of suggestions provides a multi-word suggestion for potentially replacing the first word. The method further includes displaying, on a display device, the set of suggestions, and highlighting a portion of the textual content, as displayed on the display device, for potentially changing to one of the suggestions from the set of suggestions.

10 Claims, 8 Drawing Sheets

INTERACTIVE TEXT EDITING

CROSS REFERENCE TO RELATED APPLICATIONS

This application is a continuation application of, and claims priority to U.S. utility application Ser. No. 13/270,927, filed on Oct. 11, 2011, which claims priority to U.S. provisional application No. 61/542,727, filed on Oct. 3, 2011. The entire contents of the above referenced applications are incorporated herein by reference.

TECHNICAL FIELD

The present disclosure relates to editing text passages on a computing device.

BACKGROUND

Text editing software allows a user to edit a body of text to correct spellings or fix grammatical errors.

SUMMARY

Methods and systems described herein can be used to implement a text editing system that improves the editing experience for a user. For example, editing a text can be made more efficient by providing word level and phrase level suggestions in a unified interface.

In one aspect a method for providing suggestions includes capturing audio that includes speech and receiving textual content from a speech recognition engine. The speech recognition engine performs speech recognition on the audio signal to obtain the textual content, which includes one or more passages. The method also includes receiving a selection of a portion of a first word in a passage in the textual content, wherein the passage includes multiple words, and retrieving a set of suggestions that can potentially replace the first word. At least one suggestion from the set of suggestions provides a multi-word suggestion for potentially replacing the first word. The method further includes displaying, on a display device, the set of suggestions, and highlighting a portion of the textual content, as displayed on the display device, for potentially changing to one of the suggestions from the set of suggestions.

In another aspect, a system includes a suggestion engine and a user interface rendered on a display device. The suggestion engine is configured to retrieve, in response to a selection of a portion of a first word in a passage, a first set of suggestions to change the first word, and select from the first set, a second set of suggestions. At least one suggestion from the second set of suggestions provides a multi-word suggestion for potentially replacing the first word. The user interface is configured to display the second set of suggestions, and display a highlighted portion of the passage for potentially changing to one of the second set of suggestions.

In another aspect, the application features a computer program product that includes computer readable instructions tangibly embodied in a storage device. The instructions are configured to cause one or more processors to perform various operations. The operations include receiving a selection of a portion of a first word in a passage, and retrieving a first set of suggestions to change the first word. Operations also include selecting, from the first set, a second set of suggestions, wherein at least one suggestion from the second set provides a multi-word suggestion for the first word. Operations further include displaying, using an user interface, the second set of suggestions, and highlighting a portion of the passage, as displayed on a display device, for potentially changing to one of the second set of suggestions.

Implementations can include one or more of the following. Retrieving the set of suggestions can further include selecting a second set of suggestions from a first set of suggestions that can potentially change various words and combination of words from the passage. The first set of suggestions can include words and phrases that can potentially change one or more portions of the passage, the one or more portions including the first word. The highlighting can be based on the second set of suggestions. a global correction span corresponding to the second set of suggestions can be determined. The global correction span can include all the words from the passage that could potentially be changed by the second set of suggestions. The global correction span can be determined as a union of the corrections spans corresponding to the individual suggestions in the second set of suggestions. The second set of suggestions can include a predetermined number of suggestions from the first set of suggestions. The predetermined number can depend on an available area on the user interface. The predetermined number of suggestions can be selected from the first set based on an order of appearance of the suggestions in a ranked list derived from the first set. The predetermined number of suggestions can be selected from the first set based on an order of appearance of the suggestions in a ranked list derived from the first set. Displaying the set of suggestions can also include adding one or more words from the passage to one or more of the suggestions from the second set, and visually distinguishing the added words from other words in the suggestions.

A suggestion repository can be configured to store suggestions related to the passage and provide one or more of the stored suggestions to the suggestion engine as the first set of suggestions. The suggestion engine can be further configured to determine a range of the highlighted portion of the passage based on the second set of suggestions. The suggestion engine can be further configured to determine the global correction span corresponding to the second set of suggestions. The suggestion repository can reside on a computing device on which the suggestion engine is implemented. The display device can be a part of the computing device. The computing device can be a smartphone. The user interface can be configured to display a predetermined number of suggestions and the suggestion engine can be further configured to limit a size of the second set of suggestions to the predetermined number. The suggestion engine can be further configured to select the predetermined number of suggestions for the second set based on an order of appearance of the suggestions in a ranked list derived from the first set. The suggestion engine can be further configured to add one or more words from the passage to one or more of the suggestions in the second set. The user interface can be further configured to display the second set such that the added words are visually distinguished from other words in the suggestions. The portion of the passage that is highlighted can substantially correspond to the global correction span.

Implementations of the methods and systems described herein can exhibit one or more of the following advantages. Phrase-level and word-level suggestions can be combined in a single user interface. Suggestions spanning neighboring words can be provided even when only one particular word has been selected by a user. Because highlighting the original text is based on the suggestions that are finally displayed, the maximum range that may be affected or changed by the suggestions is readily conveyed. Each word of the individual suggestions can be color coded or otherwise marked to show whether the word is a suggested change or a part of the original text. By having a combined interface, word-level suggestions from a dictionary can be combined with more complex (e.g. learning based) paradigms that provide phrase level suggestions.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Text editing systems, in general, facilitate corrections or other improvements to a body or passage of text. For example, a text editing system can provide spelling check functionalities to correct spelling errors. In some cases, a text editing system can provide one or more alternative suggestions to a particular word or phrase. If a user selects one of the suggestions, a corresponding word or portion of the passage can be changed or replaced in accordance with the selected suggestion. The present application features methods and systems for providing word-level, phrase level, sentence level suggestions or suggestions of other granularities together in a unified interface. In general, the span or range of original text that can be potentially changed by the displayed suggestions is more than that of a corresponding user-selection. For example, if a user chooses a word (or even a portion of a word) from a given text, the displayed suggestions can include phrases that replace or change one or more additional words in the neighborhood of the selected word. The suggestions from a given displayed set can therefore have lengths different from one another. In general, one or more of the following types of potential changes can be included in a given set of suggestions: changing or replacing a word by a word, changing or replacing a word by a phrase, changing or replacing a phrase by a word, and changing or replacing a phrase by a phrase. The term phrase, as used herein, refers to a group of words and can also include entire sentences.

The methods and systems described herein can be used in conjunction with several applications, for example, word processors, e-mail systems, text messaging systems, or other applications that require editing of text. In some implementations, the text editing systems and methods described herein can be used in conjunction with automated text recognition systems such as speech recognition systems or optical character recognition (OCR) systems.

In some implementations, a given recognized text string may need to be manually corrected by a user. For example, a verbal input "pictures of the Golden Gate Bridge at sunset" may be recognized by a text recognition system as "pictures of a Golden Gate bridge and sunset." The user could then edit the text returned from the speech recognition system and correct the mistakes. In such cases, the text editing methods and systems described herein can be used for facilitating faster and more efficient text editing. By providing suggestions that span not only a selected word but also additional words, larger blocks of text may be corrected even when a much smaller span or range is selected.

Figure 1:
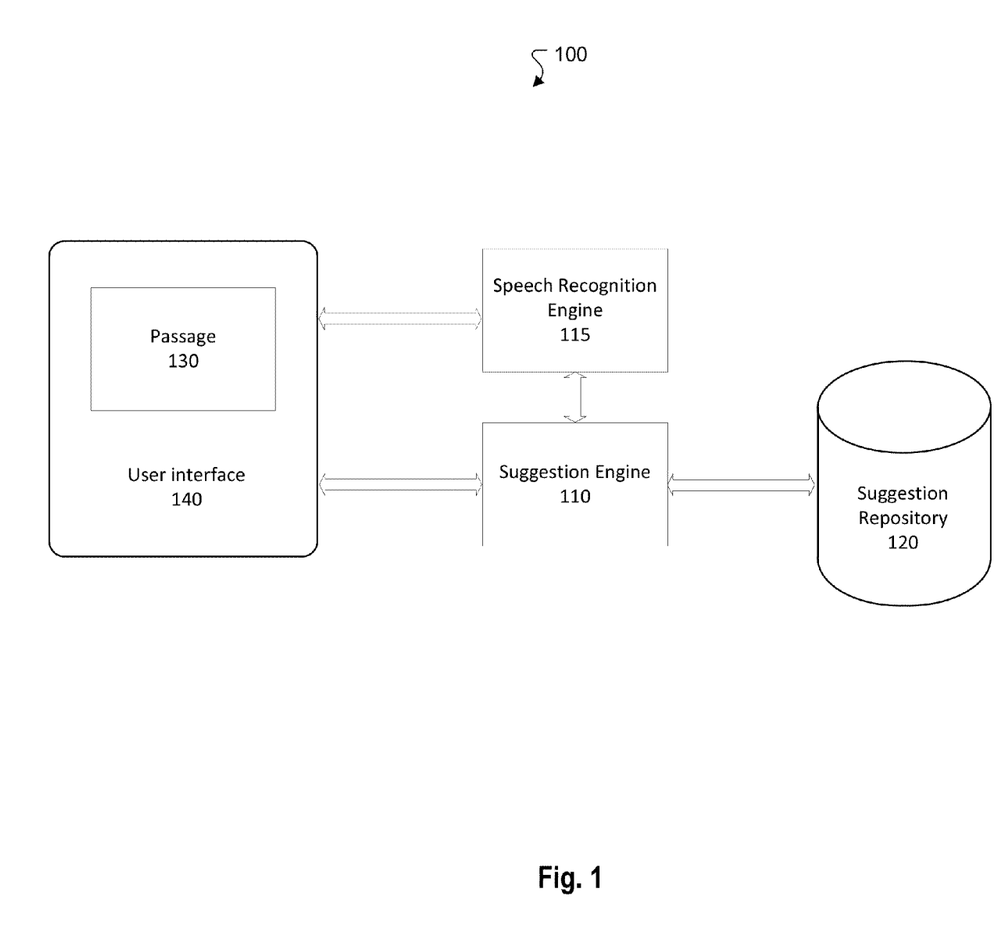
FIG. 1 is a block diagram of an example of a text editing system.

FIG. 1 is a block diagram of an example of a text editing system 100 that can be used to provide combined word-level and phrase-level suggestions as described herein. In general, the system 100 includes a suggestion engine 110 that communicates with a suggestion repository 120 to provide text edits suggestions related to a passage 130 displayed a graphical user interface 140 of a computing device such as a smartphone or laptop. The suggestion repository 120 can be stored on a storage device, for example, as a database. In some implementations, where the text editing system 100 is used in conjunction with a speech recognition system, the suggestion engine 110 communicates with a speech recognition engine 115. The speech recognition engine 115 can receive speech input as audio signals and provide textual content based on the input. In some implementations, the suggestion engine 110 can be implemented as a part of the speech recognition engine 115.

The speech recognition engine 115 is an example of text recognition systems that can be used in conjunction with the methods and systems described herein. In general, a text recognition system is used to extract text from input signals (such as audio or image signals) that reflect information including words or other symbols. A text recognition system can include, for example, a machine learning system (e.g., a hidden Markov model, a feature based linear regression, or an artificial neural network) that trains a model, used to detect text in the input signals, by analyzing numerous example input signals that have each been paired with a known text string representing the words or symbols that are reflected in that input signal. A set of input signal and text string pairs used for this purpose are usually called training data. In some implementations, additional training data may be collected from one or more users of a text recognition system and used to further refine a model used by the text recognition system. When many users (e.g., thousands of users) access and utilize a text recognition system through a network, the users may collectively be a vast and cost efficient source of training data. In some implementations, the speech recognition engine 115 can include an audio capture device such as a microphone to capture audio signals representing speech.

The passage 130 can be a body of text from various sources and in various forms. In some implementations, the passage 130 can be the output of a text recognition system. For example, the passage 130 can be the output of a speech recognition engine 115. In some implementations, the passage 130 can be a body of text in a word processing application. The passage 130 can also be at least a part of, for example, an e-mail message, a message for a short messaging system (SMS) application, a search query, a fillable form or other applications that facilitate text input. In general, the passage 130 includes electronic text that can be edited. The passage can also be of various sizes. For example, the passage 130 can be a paragraph, sentence or even a single word.

In general, the passage 130 is displayed on the user interface (UI) 140. The UI 140 can be rendered on a display device, for example, a computer screen or a display of a mobile device. The UI 140 can be, for example, a graphical user interface (GUI) or a text based interface. In general, the UI 140 represents information and/or available actions to a user through graphical icons, visual indicators, text or a combination thereof. When a text editing system provides one or more suggestions related to the passage 130, the suggestions can also be displayed using the UI 140. For example, the suggestions or options can be displayed using a graphical icon such as a drop down menu that may overlap with at least a portion of the passage 130. Typically, the drop-down menu includes the different suggestions provided by the suggestion engine 110 as user selectable options. The drop-down menu can include both word level as well as phrase level suggestions that are displayed together.

In some implementations, the UI 140 can be configured to accept user inputs based on the user selectable options provided by the suggestion engine 110. The user can choose an option by selecting one or more of the graphical icons, visual indicators, or text strings. For example, if the UI 140 is rendered on a touchscreen display, a user can select an available action by touching one of the options presented on the UI 140. Similarly, the options presented via the UI 140 can also be chosen, for example, using a mouse click, keyboard input, a voice command, or another form of user input.

The suggestion engine 110 provides one or more suggestions based on words, phrases, or parts thereof from the passage 130. In some implementations, a word, phrase or a part thereof can be selected through the UI 140 and provided to the suggestion engine 110. Based on the selection, the suggestion engine 110 can communicate with the suggestion repository 120 to determine a list of related suggestions and provide the list to the UI 140 for display. The suggestion engine 110 can be implemented on a computing device as any combination of software and hardware modules. In some implementations the suggestion engine 110 can be implemented in a computing device that is remote to the computing device that executes and/or renders the UI 140. In some implementations the suggestion engine 110 and the UI 140 can be implemented on a same computing device.

The set of suggestions retrieved by the suggestion engine 110 from the suggestion repository 120 (referred hereinafter as the first set) can be filtered by the suggestion engine 110 such that a second set of suggestions provided to the UI 140 does not include all the suggestions retrieved from the suggestion repository 120. The suggestion engine 110 can filter the first set in various ways. In some implementations the suggestion engine 110 can select a predetermined number of suggestions from the first set to include in the second set. The predetermined number can be determined based on, for example, a display area available on the UI 140 to display the second set. For example, if the UI 140 is displayed on a mobile device, the number of suggestions in the second set can be lower than when the UI 140 is displayed on a larger screen such as a desktop monitor. The predetermined number of suggestions can be chosen from the first set in various ways. For example, the suggestion engine 110 can select the suggestions to be included in the second set based on an order in which the suggestions are retrieved from the suggestion repository 120. In some implementations, the suggestion engine 110 can rank the suggestions retrieved from the suggestion repository 120 based on one or more ranking algorithms and select the predetermined number of suggestions from the ranked list. The suggestion repository 120 can also be configured to store and/or provide the suggestions in a ranked order.

The ranking can be based on various criteria including, for example, popularity, computed likelihood of usage, number of words, or user preferences. For example, if alternative suggestions to the word "lunch" are "munch," "brunch," "crunch," and "breakfast," and the words "brunch" and "breakfast" are ranked higher than "munch" and "crunch" based on the popularity of usage, "brunch" and "breakfast" can be included in the second set ahead of "munch" and "crunch." In some implementations, the suggestion engine 110 can be configured to record user preferences and use the recorded preferences (for example, by using a machine learning algorithm) as feedback to provide future second sets. Such feedback can be both user specific or general. For example, the suggestion engine 110 can be configured to track the preference history of a particular user and select the second set based on the preference history. In another example, the suggestion engine 110 can track overall popularity of the suggestions provided and use that information to select the second set.

Because the second set of suggestions can include words as well as phrases, the number of words from the original passage that can be changed using the second set can vary from one suggestion to another. The group of words that are changed are affected by choosing a particular suggestion from the second set can be referred to as a correction span for the particular suggestion. If each correction span is viewed as a set, the union of all correction spans corresponding to the suggestions in the second set forms a global correction span for the second set. The global correction span indicates the maximum range from the passage 130 that is affected by the suggestions provided in the second set. Because the global correction span is a union of all the individual correction spans corresponding to the different suggestions, choosing a particular suggestion may not change all the words in the global correction span. In some implementations, the suggestion engine 110 can also be configured to highlight the global correction span in the original passage 130 based on the suggestion selected for the second set. The suggestion engine 110 can additionally be configured to color code which word (or words) in each suggestion is a part of the original passage 130. Alternatively, the words in the suggestions that are not present in the original passage 130 can be color-coded. In some implementations, both the words that appear in the original passage 130 as well as the words that do not can be separately color-coded. The highlighting and color coding operations are illustrated below with reference to FIGS. 3A-3C.

The suggestion engine 110 communicates with the suggestion repository 120 to retrieve suggestions based on a word, phrase, sentence etc., or parts thereof selected by a user. The suggestion repository 120 can include sources that provide word level suggestions (for example, synonyms, phonetically similar words, or opposites) as well as sources that provide phrase level alternatives (for example, groups of words that are similar in terms of meaning and/or context). For example, when the text editing system 100 is used in conjunction with a speech recognition system, the suggestion repository 120 can include a dictionary (for word level suggestions) as well as alternative phrase level suggestions from a speech recognition server. In some implementations, the phrase level suggestions can also include substantially complete sentences if a portion of the passage 130 is determined (for example, by software) to be grammatically incorrect. In general, the suggestion repository 120 can access or store suggestions from the different sources and provide such suggestions to the suggestion engine 110.

In some implementations, the suggestion repository 120 can reside on the same computing device (for example, as a database) that executes the suggestion engine 110 and/or the UI 140. For example, a global list of suggestions can be downloaded and stored on a mobile device or computer that executes the suggestion engine 110. In some implementations, the suggestion repository 120 can reside on a computing device (for example, a server) that is remote to the computing device that executes the suggestion engine 110. In such cases, the suggestion engine 110 can communicate with the suggestion repository 120 and retrieve suggestions based on user selections. For example, when the text editing system 100 is used in conjunction with a speech recognition system, as a user dictates text, the speech recognition server can supply a number of alternative suggestions for words or phrases to the suggestion engine 110.

Figure 2:
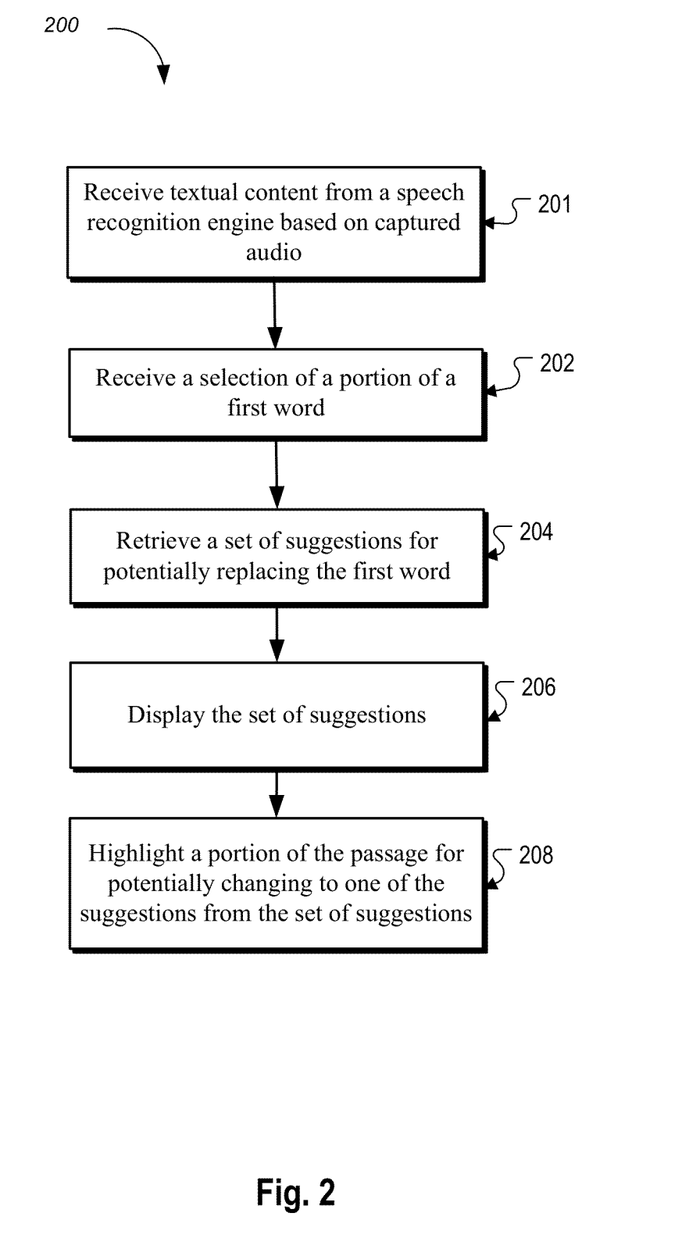
FIG. 2 is a flow chart of an example sequence of operations for providing suggestions for text edits.

FIG. 2 is a flowchart 200 that depicts an example sequence of operations for providing suggestions for text edits. In some implementations, some or all of the operations are depicted in the flowchart 200 can be performed at the suggestion engine 110. In some cases, the operations may be distributed over a plurality of computing devices. For example, when the text editing system 100 is implemented as a client-server architecture, some of the operations may be performed at the client whereas the other operations can be performed at the server. Alternatively, all of the operations can be performed on a single computing device such as a client.

Operations can include receiving textual content from a speech recognition engine (201). The textual content can be based on audio signals captured using an audio capture device such as a microphone. The audio signals represent speech and can emanate from various sources such as a human speaker or an electronic device configured to record and playback human speech. The speech recognition engine recognizes speech from the captured audio signals and provides the textual content. The textual content can receive one or more passages of text each of which can include one or more words.

Operations include receiving a selection of a portion of a first word (202). The selection can be received from a user thorough an input device. The input device can include, for example, a pointing device such as a mouse, a keyboard, or a touchscreen display. For example, if the passage is rendered on a touchscreen display, a user can touch (or point to) a word or a portion thereof to make the selection. In some implementations, the selection can also include a whole word, a group of words, a phrase, or a sentence. In some implementations, the selection may be made automatically by software, for example, on determining that a sentence or a portion thereof is grammatically incorrect.

Figure 3A:
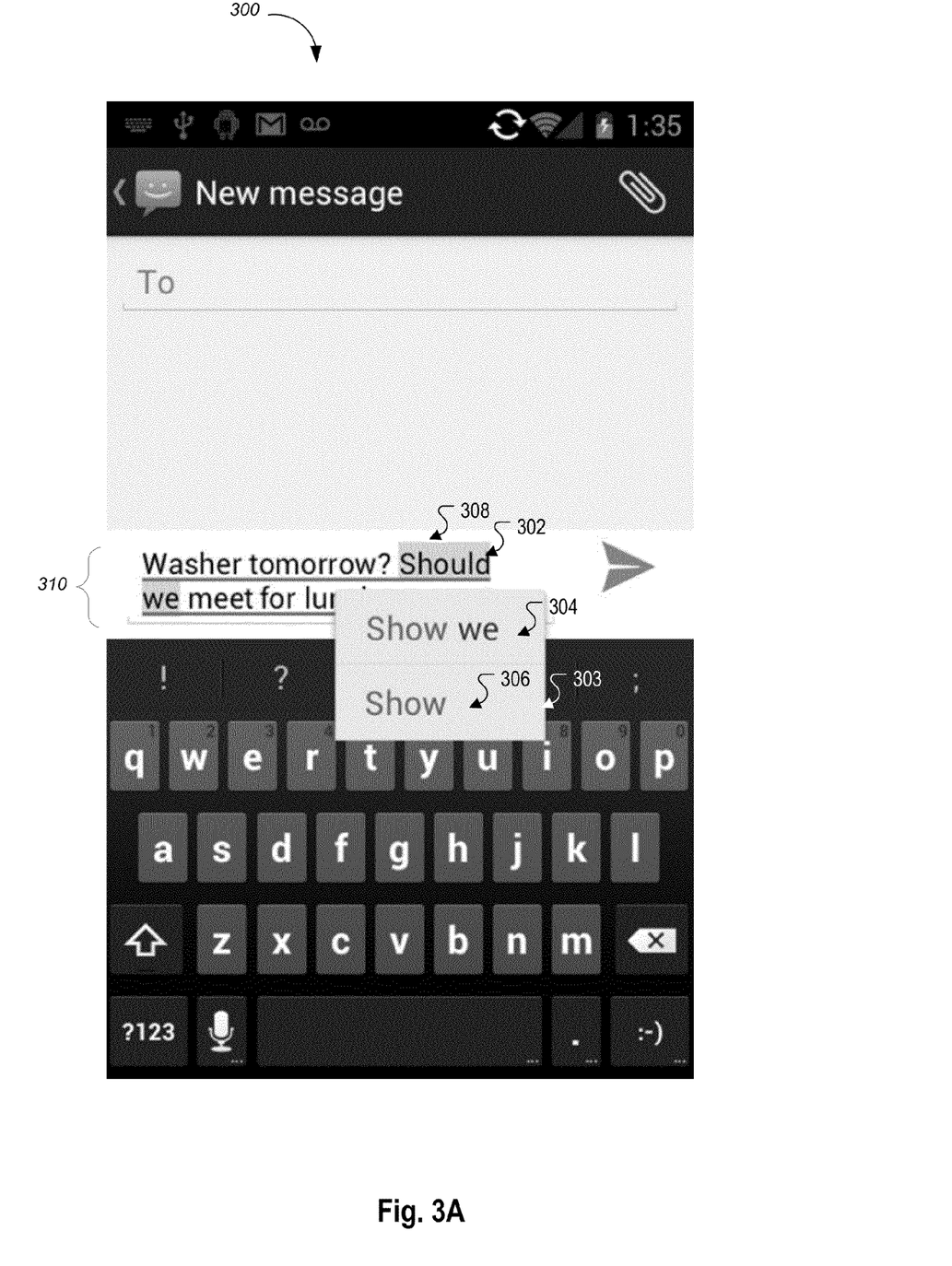
FIGS. 3A-3C are examples of interfaces for interactive text editing.
Figure 3B:
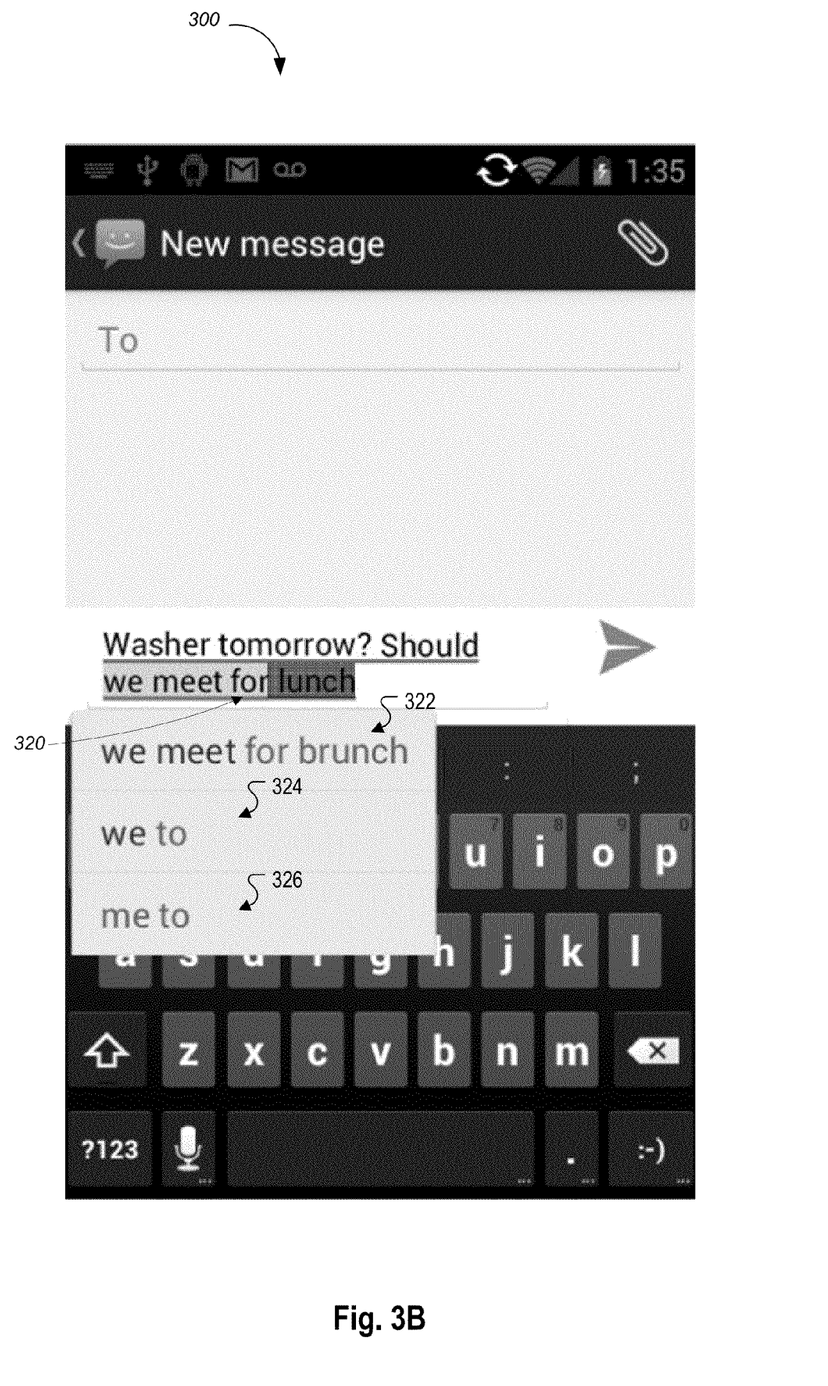
Figure 3C:
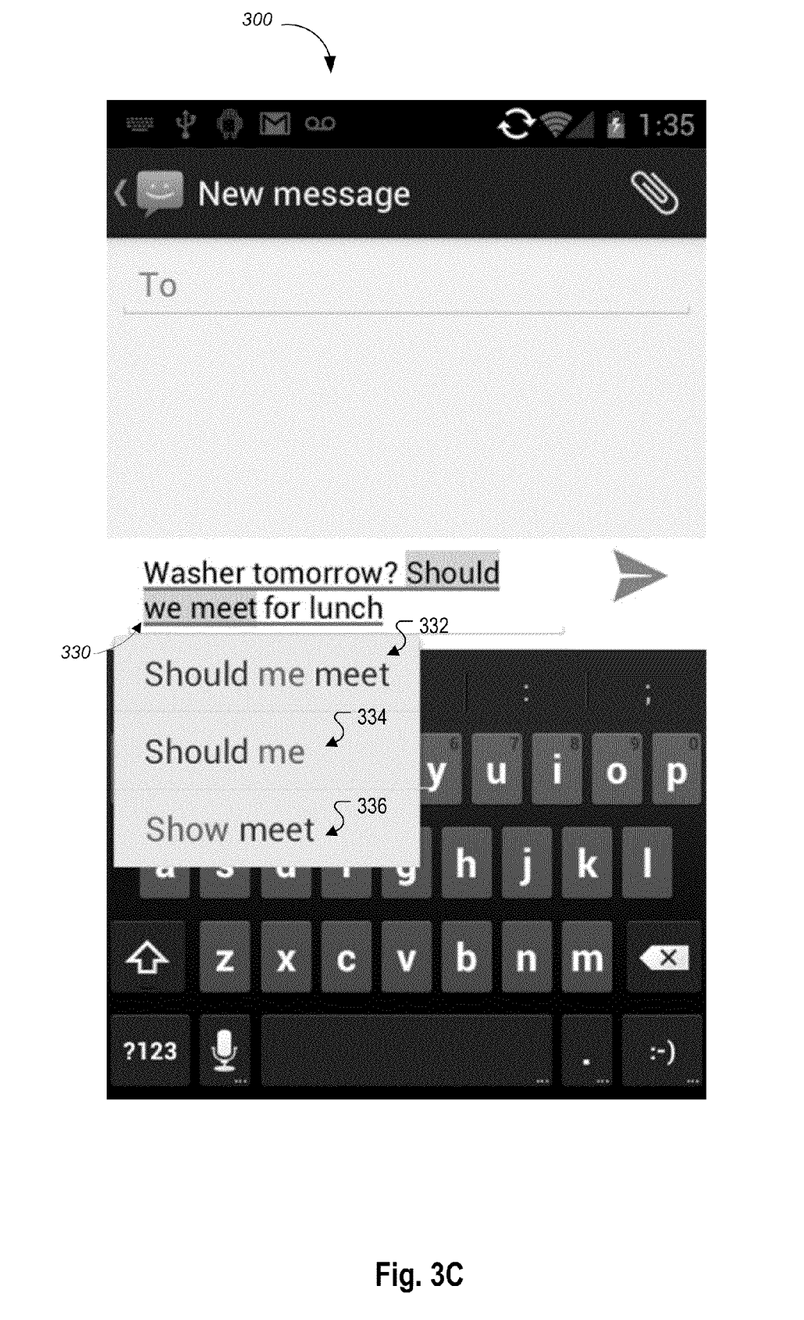

FIGS. 3A-3C show various examples of interactive text editing via an interface 300. The examples of FIGS. 3A-3C illustrate interactive text editing for a passage 310. It should be noted that the interface 300 (an interface rendered on a mobile device) is an example of the UI 140 described with reference to FIG. 1 and should not be considered limiting. In the example of FIG. 3A, the selection is made by touching or pointing to the word "should" 302. The word 302 can be selected by touching or pointing to any portion of the word, for example, the letter "o." In FIG. 3B, the selection is made by touching the word "for" 320 or a portion thereof. In FIG. 3C, the selection is made by touching the word "we" 330 or a portion thereof.

Operations also include retrieving a set of suggestions for potentially changing or replacing the first word (204). Retrieving the set of suggestions can include selecting the set (which is substantially similar to the second set of suggestions described with reference to FIG. 1) from another set (which is substantially similar to the first set of suggestions described with reference to FIG. 1) received, for example, from the suggestion repository 120. The first set of suggestions includes word level suggestions as well as phrase level suggestions that could potentially change one or more words from the original passage. The original words that are potentially changed typically include the first word. In some implementations, the first set of suggestions includes all possible suggestions related to the passage 310. Retrieving the first set of suggestions (204) can therefore include parsing the passage 310 for various word combinations and checking if one or more suggestions exist for each of those combinations. For example, the passage 310 can be parsed to come up with the following first set of suggestions:

1) Washer: Should we
    2) Washer tomorrow: Washing today
    3) Should: Show
    4) we: me
    5) we meet: me
    6) Should we: Show
    7) for: for brunch
    8) meet for: to
    9) we meet for: me to In the set of suggestions shown above, each entry first presents a word or group of words from the passage that could be replaced. This is followed by a separation character such as ":". A corresponding suggestion available in the suggestion repository 120 is presented to the right of the separation character. The word or words on the left of the separation character represent a portion that would be changed upon selection of the particular suggestion and can therefore be referred to as the correction span for the particular suggestion. In some implementations, the first set of suggestions includes only the suggestions that are related to the selection, i.e. the first word. In some implementations, the first set of suggestions can be ranked in order of importance. The ranking may be performed by the suggestion engine 110 or can be predefined, for example, in the way the suggestions are stored in the suggestion repository 120. In some implementations, only the combinations that include the first word can be checked for available suggestions.

Retrieving the set of suggestions (204) can also include selecting a second set from the first set. The second set of suggestions can be selected from the first set based on one or more predefined rules. For example, the second set of suggestions can be chosen based on the selection, i.e. the first word. In the example shown in FIG. 3A, the first word is the word "should" 302. In this example, the second set of suggestions can include only the suggestions that are related to the word 302, i.e. "Should we: Show" and "Should: Show." In the example shown in FIG. 3B, the first word is the word "for" 320. Therefore in this example the second set of suggestions can include only "for: for brunch," "meet for: to," and "we meet for: me to." Similarly, because the first word in the example of FIG. 3C is "we" 330, correspondingly the second set of suggestion includes "we: me," "we meet: me," and "Should we: Show."

In some implementations, a predetermined number of suggestions are included in the second set even when a larger number of potential suggestions are available. The predetermined number can be decided, for example, on the space available in the corresponding user interface. For example, if the predetermined number for the case illustrated in FIG. 3C was two, only the suggestions 322 and 324 would have been included in the second set even though the suggestion 326 would also have been eligible for inclusion. When a larger number of suggestions are available for inclusion, the suggestions that are included in the second set can be selected, for example, based on their position in a ranked list, based on an order of retrieval from the suggestion repository 120, or randomly. In some implementations, selecting the second set of suggestions (206) can also be based on machine learning algorithms that track usage of the suggestions, for example, from training data, feedback, etc.

Operations also include displaying the set of suggestions (206). The displayed set of suggestions can be substantially same as the second set of suggestions described above. The second set of suggestions can be displayed as a part of the same UI (e.g. the UI 140 shown in FIG. 1) on which the original passage is rendered. In some implementations, the second set of suggestions can also be displayed in a separate user interface. The second set of suggestions is usually displayed as a drop-down menu such as a menu 303 shown in FIG. 3A. In some implementations, the size of the drop-down menu can depend on the number of suggestions in the second set. Alternatively, the size of the drop-down menu can be predetermined and a font size for the display suggestions can be varied based on the number of suggestions in the second set.

In some implementations, displaying the set of suggestions (206) also includes color coding (or visually distinguishing using another technique) the words appearing in each of the suggestions. The color coding depends on the global correction span of the second set of suggestions. Typically, for a given suggestion, the set of words that correspond to the original text and the set of words that the suggestion proposes as alternatives are displayed in different colors. As described above with reference to FIG. 1, the global correction span for a given second set is determined as a union of the corrections spans of the individual suggestions in the set. For example, in FIG. 3A, the correction span for the suggestion 306 is "should we," and the correction span for the suggestion 304 is "should." Therefore the global correction span (or the union of the individual correction spans) for this example is "should we." Once the global correction span is identified, words are prepended or appended, as required, to the individual suggestions such that the corresponding correction spans become equal to the global correction span. In the example of FIG. 3A, the word "we" is appended to the suggestion 304 to make the corresponding correction span equal to the global correction span. This effectively means that any individual suggestion from the second set, if selected, replaces the entire global correction span in the original text. The words appended or prepended to any individual suggestions can be displayed in a different color to differentiate from the words that are proposed as alternatives to words existing in the original text. For example, in the suggestion 304, the word "show" (a proposed alternative) and the word "we" (which is a part of the original text) are displayed in different colors or shades.

Similarly, in the example of FIG. 3B, the global correction span is "we meet for lunch," and words in the suggestions 322, 324 and 326 are color coded accordingly to reflect which words are from the original text and which are suggested alternatives. For example, the color coding of the suggestion 322 indicates that the words "we meet" appear in the original text whereas "for brunch" is a suggested alternative phrase. In the example of FIG. 3C, the global correction span is "Should we meet," and the suggestions 332, 334 and 336 are color coded accordingly.

Operations also include highlighting a portion of the passage for potentially changing to one of the second set of suggestions (208). The portion that is highlighted is substantially equal to the global correction span for the corresponding set of suggestions. For example, in the example of FIG. 3A, the highlight 308 visually distinguishes the corresponding global correction span. Similarly, FIGS. 3B and 3C illustrates highlighting of the corresponding global correction spans, which in turn are determined based on the corresponding displayed set of suggestions. It should be noted that the term highlighting, as used herein, refers to visually distinguishing a portion of a text from the rest. Highlighting therefore includes, for example, underlining, bolding, italicizing, using a distinguishing font or background, or other graphical ways to distinguish one portion of the text from the rest.

Figure 4:
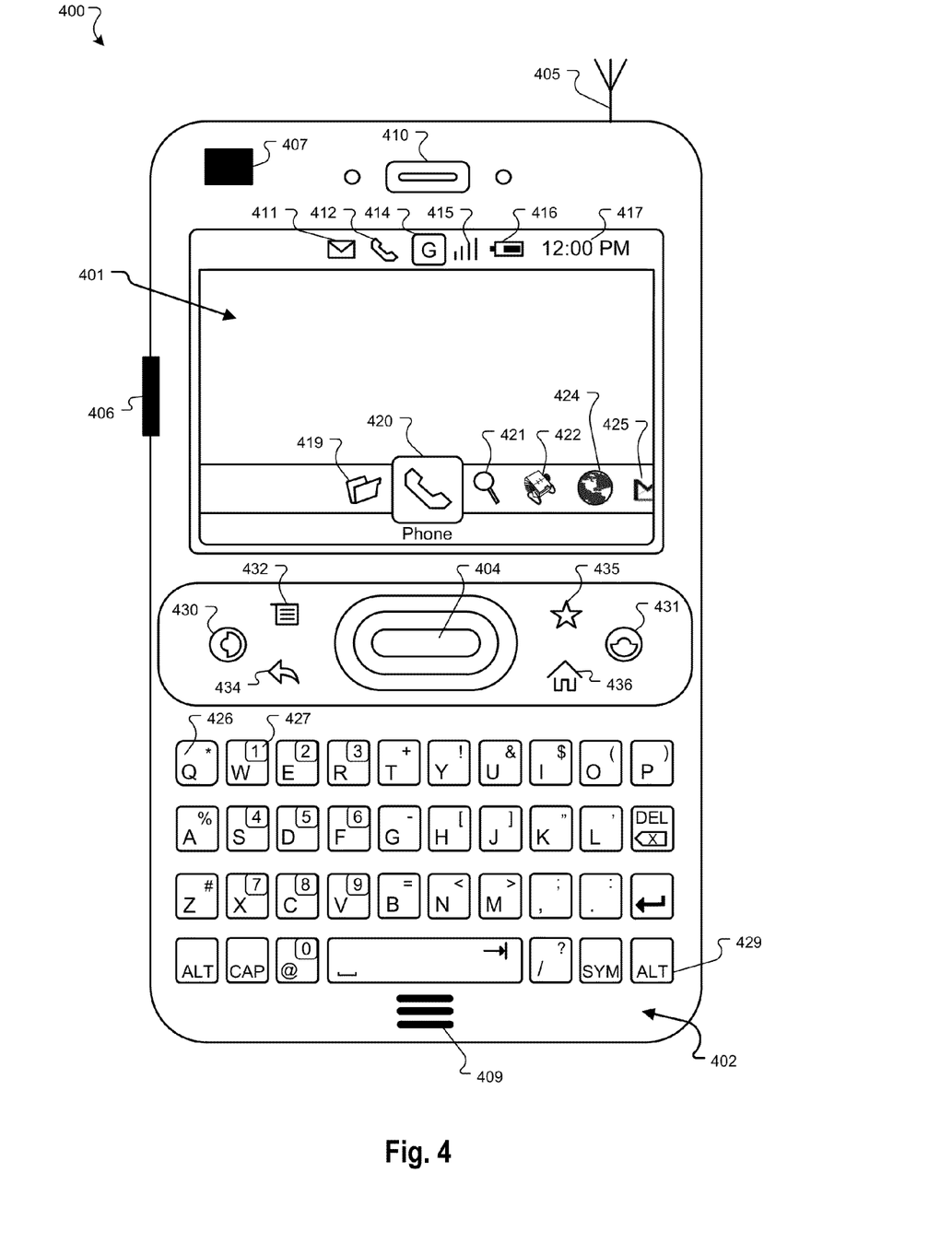
FIG. 4 is a schematic representation of an example of a mobile device that facilitates interactive text editing.

Referring now to FIG. 4, the exterior appearance of an example of a mobile device 400 that implements one or more portions of the text editing system 100 is illustrated. Briefly, and among other things, the device 400 includes a processor configured to execute instructions for performing operations of a suggestion engine and rendering a UI such as the UI 140. In some implementations, the mobile device can also include the suggestion repository 120.

In more detail, the hardware environment of the device 400 includes a display 401 for displaying text, images, and video to a user; a keyboard 402 for entering text data and user commands into the device 400; a pointing device 404 for pointing, selecting, and adjusting objects displayed on the display 401; an antenna 405; a network connection 406; a camera 407; a microphone 409; and a speaker 410. Although the device 400 shows an external antenna 405, the device 400 can include an internal antenna, which is not visible to the user.

The display 401 can display video, graphics, images, and text that make up the user interface for the software applications used by the device 400, and the operating system programs used to operate the device 400. Among the possible elements that may be displayed on the display 401 are a new mail indicator 411 that alerts a user to the presence of a new message; an active call indicator 412 that indicates that a telephone call is being received, placed, or is occurring; a data standard indicator 414 that indicates the data standard currently being used by the device 400 to transmit and receive data; a signal strength indicator 415 that indicates a measurement of the strength of a signal received by via the antenna 405, such as by using signal strength bars; a battery life indicator 416 that indicates a measurement of the remaining battery life; or a clock 417 that outputs the current time. In some implementations, the UI 140 described with reference to FIG. 1 can be rendered on the display 401. The display 401 can also be a touch screen display configured to act both as an input device as well as an output device.

The display 401 may also show application icons representing various applications available to the user, such as a web browser application icon 419, a phone application icon 420, a search application icon 421, a contacts application icon 422, a mapping application icon 424, an email application icon 425, or other application icons. In one example implementation, the display 401 is a quarter video graphics array (QVGA) thin film transistor (TFT) liquid crystal display (LCD), capable of 16-bit or better color.

A user uses the keyboard (or "keypad") 402 to enter commands and data to operate and control the operating system and applications that provide for interaction with text recognition systems. The keyboard 402 includes standard keyboard buttons or keys associated with alphanumeric characters, such as keys 426 and 427 that are associated with the alphanumeric characters "Q" and "W" when selected alone, or are associated with the characters "*" and "1" when pressed in combination with key 429. A single key may also be associated with special characters or functions, including unlabeled functions, based upon the state of the operating system or applications invoked by the operating system. For example, when an application calls for the input of a numeric character, a selection of the key 427 alone may cause a "1" to be input.

In addition to keys traditionally associated with an alphanumeric keypad, the keyboard 402 also includes other special function keys, such as an establish call key 430 that causes a received call to be answered or a new call to be originated; a terminate call key 431 that causes the termination of an active call; a drop down menu key 432 that causes a menu to appear within the display 401; a backward navigation key 434 that causes a previously accessed network address to be accessed again; a favorites key 435 that causes an active web page to be placed in a bookmarks folder of favorite sites, or causes a bookmarks folder to appear; a home page key 436 that causes an application invoked on the device 400 to navigate to a predetermined network address; or other keys that provide for multiple-way navigation, application selection, and power and volume control.

The user uses the pointing device 404 to select and adjust graphics and text objects displayed on the display 401 as part of the interaction with and control of the device 400 and the applications invoked on the device 400. The pointing device 404 is any appropriate type of pointing device, and may be a joystick, a trackball, a touch-pad, a camera, a voice input device, a touch screen device implemented in combination with the display 401, or any other input device. In some implementations, the pointing device 404 can be a part of the display 401, for example, where the display 401 is a touch-screen display.

The antenna 405, which can be an external antenna or an internal antenna, is a directional or omni-directional antenna used for the transmission and reception of radiofrequency (RF) signals that implement point-to-point radio communication, wireless local area network (LAN) communication, or location determination. The antenna 405 may facilitate point-to-point radio communication using the Specialized Mobile Radio (SMR), cellular, or Personal Communication Service (PCS) frequency bands, and may implement the transmission of data using any number or data standards. For example, the antenna 405 may allow data to be transmitted between the device 400 and a base station using wireless technologies such as Wireless Broadband (WiBro), Worldwide Interoperability for Microwave ACCess (WiMAX), 3GPP Long Term Evolution (LTE), Ultra Mobile Broadband (UMB), Time Division-Synchronous Code Division Multiple Access (TD-SCDMA), Time Division-Code Division Multiple Access (TD-CDMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Global System for Mobile communications (GSM), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 406 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 406 may connect to a LAN network, a corporate or government WAN network, the Internet, a telephone network, or other network. The network connection 406 uses a wired or wireless connector. Example wireless connectors include, for example, an IEEE Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 406 and the antenna 405 are integrated into a single component.

The camera 407 allows the device 400 to capture digital images, and may be a scanner, a digital still camera, a digital video camera, and other digital input device. In one example implementation, the camera 407 is a 4 mega-pixel (MP) camera that utilizes a complementary metal-oxide semiconductor (CMOS).

The microphone 409 allows the device 400 to capture sound, and may be an omni-directional microphone, a unidirectional microphone, a bi-directional microphone, a shotgun microphone, or other type of apparatus that converts sound to an electrical signal. The microphone 409 may be used to capture sound generated by a user, for example when the user is speaking to another user during a telephone call via the device 400. Conversely, the speaker 410 allows the device to convert an electrical signal into sound, such as a voice from another user generated by a telephone application program, or a ring tone generated from a ring tone application program. In some implementations, the microphone 409 can be used as an input device for a speech recognition system.

Although the device 400 is illustrated in FIG. 4 as a handheld device, in further implementations the device 400 may be a laptop, a workstation, a midrange computer, a mainframe, an embedded system, telephone, desktop PC, a tablet computer, a PDA, or other type of computing device.

Figure 5:
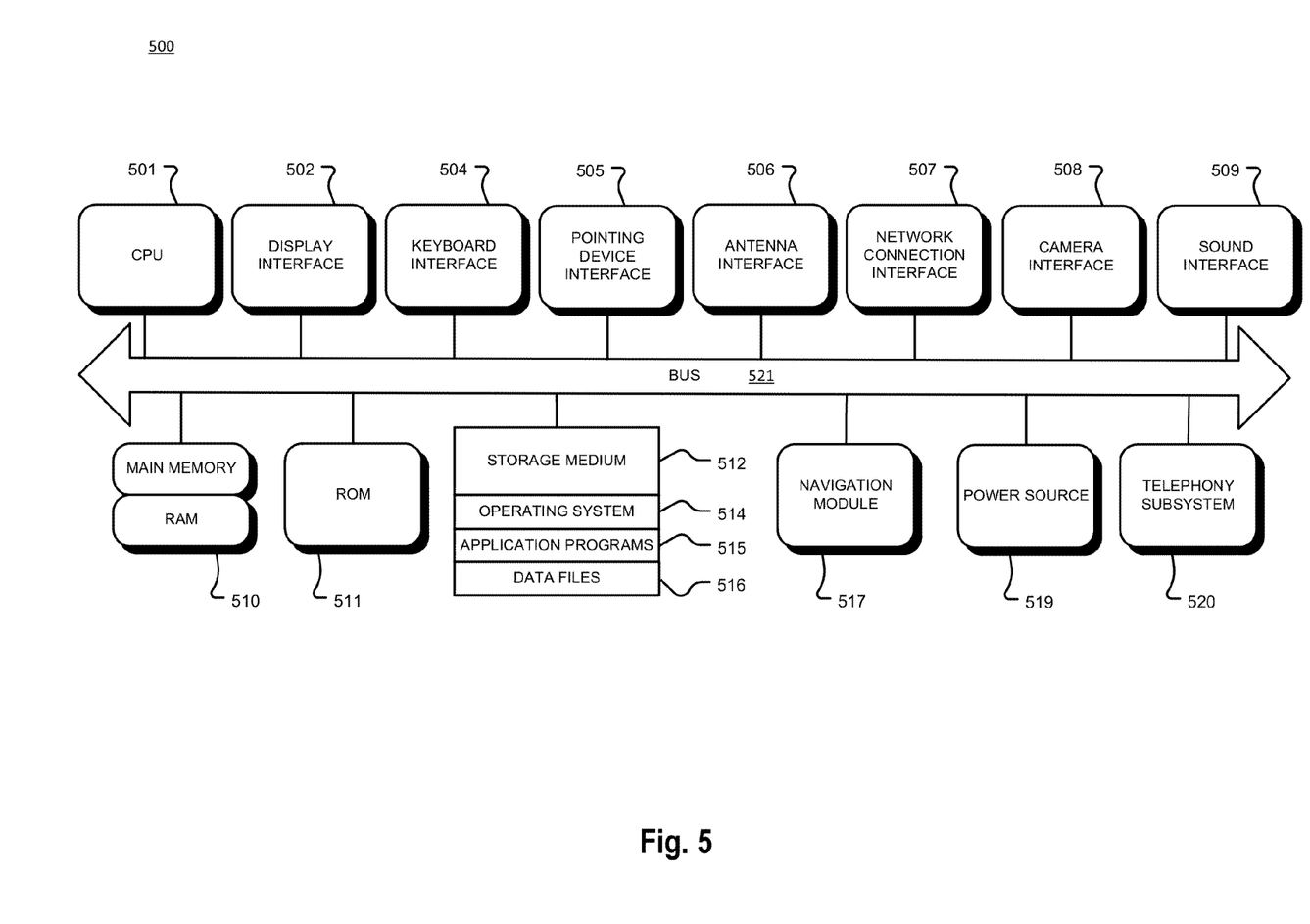
FIG. 5 is a block diagram illustrating the internal architecture of the device of FIG. 4.

FIG. 5 is a block diagram illustrating an internal architecture 500 of the device 400. The architecture includes a central processing unit (CPU) 501 where the computer instructions that comprise an operating system or an application are processed; a display interface 502 that provides a communication interface and processing functions for rendering video, graphics, images, and texts on the display 401, provides a set of built-in controls (such as buttons, text and lists), and supports diverse screen sizes; a keyboard interface 504 that provides a communication interface to the keyboard 402; a pointing device interface 505 that provides a communication interface to the pointing device 404; an antenna interface 506 that provides a communication interface to the antenna 405; a network connection interface 507 that provides a communication interface to a network over the computer network connection 406; a camera interface 508 that provides a communication interface and processing functions for capturing digital images from the camera 407; a sound interface 509 that provides a communication interface for converting sound into electrical signals using the microphone 409 and for converting electrical signals into sound using the speaker 410; a random access memory (RAM) 510 where computer instructions and data are stored in a volatile memory device for processing by the CPU 501; a read-only memory (ROM) 511 where invariant low-level systems code or data for basic system functions such as basic input and output (I/O), startup, or reception of keystrokes from the keyboard 402 are stored in a non-volatile memory device; a storage medium 512 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 514, application programs 515 (including, for example, a web browser application, a widget or gadget engine, and or other applications, as necessary) and data files 516 are stored; a navigation module 517 that provides a real-world or relative position or geographic location of the device 400; a power source 519 that provides an appropriate alternating current (AC) or direct current (DC) to power components; and a telephony subsystem 520 that allows the device 400 to transmit and receive sound over a telephone network. The constituent devices and the CPU 501 communicate with each other over a bus 521.

The CPU 501 can be one of a number of computer processors. In one arrangement, the computer CPU 501 is more than one processing unit. The RAM 510 interfaces with the computer bus 521 so as to provide quick RAM storage to the CPU 501 during the execution of software programs such as the operating system application programs, and device drivers. More specifically, the CPU 501 loads computer-executable process steps from the storage medium 512 or other media into a field of the RAM 510 in order to execute software programs. Data is stored in the RAM 510, where the data is accessed by the computer CPU 501 during execution. In one example configuration, the device 400 includes at least 128 MB of RAM, and 256 MB of flash memory.

The storage medium 512 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 400 to access computer-executable process steps, application programs and the like, stored on removable and non-removable memory media, to off-load data from the device 400, or to upload data onto the device 400.

A computer program product is tangibly embodied in storage medium 512, a machine-readable storage medium. The computer program product includes instructions that, when read by a machine, operate to cause a data processing apparatus to store image data in the mobile device. In some embodiments, the computer program product includes instructions that cause a data processing apparatus to collect and filtering text recognition system corrections from users of a text recognition system.

The operating system 514 may be a LINUX-based operating system such as a mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 514 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT.NET Compact, or another appropriate environment.

The device stores computer-executable code for the operating system 514, and the application programs 515 such as an email, instant messaging, a video service application, a mapping application word processing, spreadsheet, presentation, gaming, mapping, web browsing, JAVASCRIPT engine, or other applications. For example, one implementation may allow a user to access the GMAIL email application, an instant messaging application, a video service application, a mapping application, or an imaging editing and presentation application. The application programs 515 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, a gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for filtering of text recognition corrections using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 517 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 517 may also be used to measure angular displacement, orientation, or velocity of the device 400, such as by using one or more accelerometers.

Figure 6:
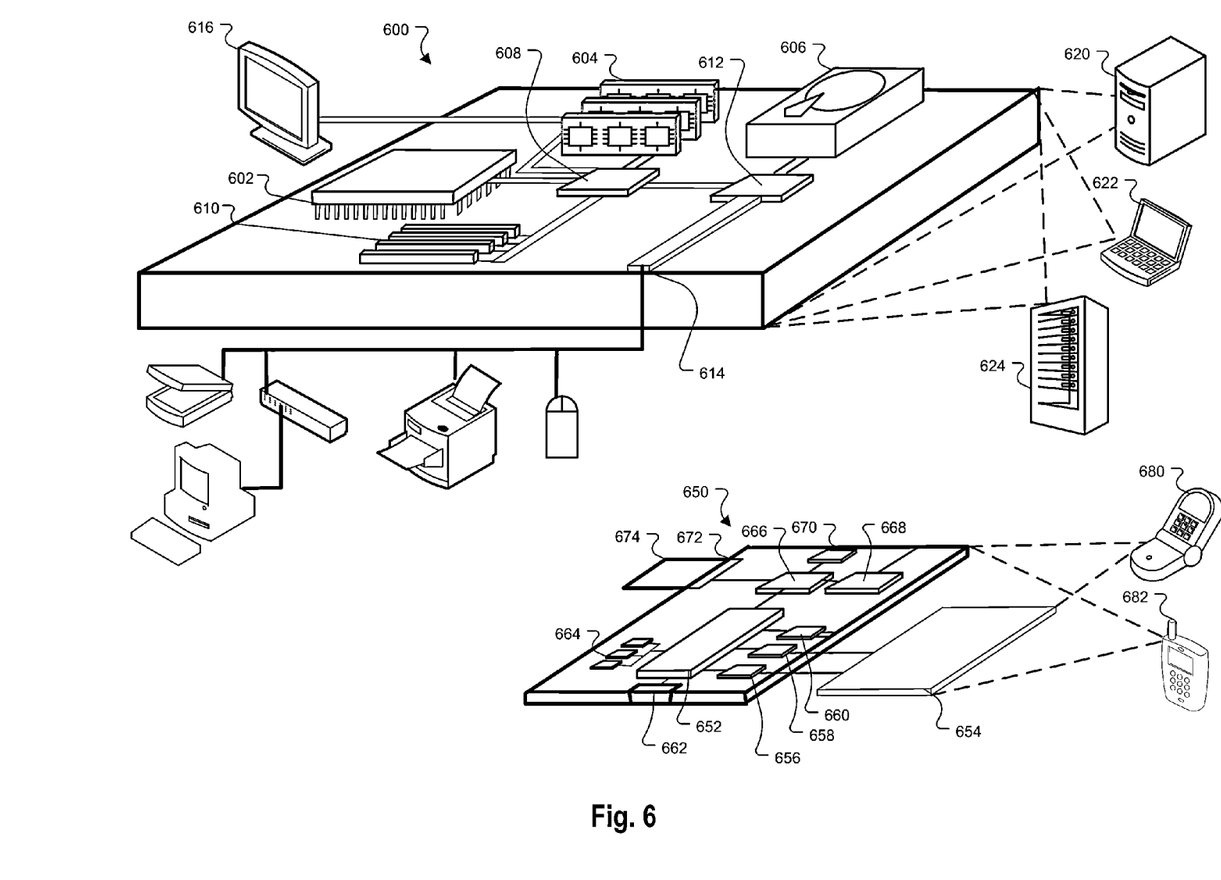
FIG. 6 shows an example of a computing device and a mobile computing device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, text recognition system may be implemented on a mobile device (e.g., mobile device 400) along with a text recognition corrections filter. The local text recognition system may be adapted to speech or handwriting patterns of a particular user, in part, by training with corrections selected using the text recognition corrections filter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for providing suggestions, the method comprising:
   capturing audio that includes speech;
   receiving textual content from a speech recognition engine, wherein:
      the speech recognition engine performs speech recognition on the audio signal to obtain the textual content, and
      the textual content includes one or more passages;
   receiving a selection of a portion of a first word in a passage in the textual content, wherein the passage includes multiple words;
   retrieving a set of presentable suggestions that can potentially replace the first word, wherein at least one suggestion from the set of suggestions provides a multi-word suggestion for potentially replacing the first word;
   displaying, on a display device, the set of suggestions; and
   highlighting a portion of the textual content, as displayed on the display device, for potentially changing to one of the suggestions from the set of suggestions.

2. The method of claim 1, wherein retrieving the set of presentable suggestions includes
   selecting a second set of suggestions from a first set of suggestions that can potentially change the passage.

3. The method of claim 2, wherein the first set of suggestions includes words and phrases that can potentially change one or more portions of the passage, the one or more portions including the first word.

4. The method of claim 2, wherein the highlighting is based on the second set of suggestions.

5. The method of claim 4, further comprising determining a global correction span corresponding to the second set of suggestions, the global correction span including all the words from the passage that could potentially be changed by the second set of suggestions.

6. The method of claim 5, wherein the global correction span is determined as a union of the corrections spans corresponding to the individual suggestions in the second set of suggestions.

7. The method of claim 2, wherein the second set of suggestions comprises a predetermined number of suggestions from the first set of suggestions.

8. The method of claim 7, wherein the predetermined number depends on an available area on the user interface.

9. The method of claim 7, wherein the predetermined number of suggestions is selected from the first set based on an order of appearance of the suggestions in a ranked list derived from the first set.

10. The method of claim 2, wherein displaying the set of suggestions further comprises:
    adding one or more words from the passage to one or more of the suggestions from the second set; and
    visually distinguishing the added words from other words in the suggestions.

* * * * *